(12) United States Patent
Bou Mezrag et al.

(10) Patent No.: US 8,783,482 B2
(45) Date of Patent: Jul. 22, 2014

(54) MODULAR RECEPTACLE FORMED BY A PLURALITY OF AXIALLY-NESTABLE CONTAINERS, AND METHOD FOR PRODUCING SUCH CONTAINERS BY MEANS OF THE BLOW-MOULDING OF A PREFORM

(75) Inventors: Mohammed Bou Mezrag, Villeneuve la Garenne (FR); Yann-Loig Bassing, Villejuif (FR)

(73) Assignee: BTC Concept, Paris (FR)

( * ) Notice: Subject to any disclaimer, the term of this patent is extended or adjusted under 35 U.S.C. 154(b) by 0 days.

(21) Appl. No.: 13/982,989

(22) PCT Filed: Jan. 27, 2012

(86) PCT No.: PCT/FR2012/000034
§ 371 (c)(1),
(2), (4) Date: Oct. 4, 2013

(87) PCT Pub. No.: WO2012/104499
PCT Pub. Date: Aug. 9, 2012

(65) Prior Publication Data
US 2014/0027336 A1    Jan. 30, 2014

(30) Foreign Application Priority Data
Jan. 31, 2011   (FR) ..................... 11 00290

(51) Int. Cl.
*B65D 21/02*    (2006.01)
(52) U.S. Cl.
CPC .......... *B65D 21/0231* (2013.01); *B65D 21/023* (2013.01); *B65D 21/0233* (2013.01)
USPC .......... 215/10; 220/23.83; 206/520; 206/519; 206/505

(58) Field of Classification Search
CPC ............ B65D 21/0231; B65D 21/023; B65D 21/0209; B65D 21/0233; B65D 21/0202; B65D 21/0201; B65D 21/0213
USPC .............. 215/10; 220/4.27, 4.26, 23.83, 23.6; 206/520, 519, 515, 509, 505
See application file for complete search history.

(56) References Cited

U.S. PATENT DOCUMENTS

| 769,615 | A | * | 9/1904 | Kosansvich | 215/10 |
| 2,488,611 | A | * | 11/1949 | Stallings | 215/10 |
| 2,641,374 | A | * | 6/1953 | Der Yuen | 215/10 |
| 6,276,549 | B1 | * | 8/2001 | Fasci et al. | 220/23.4 |
| 2010/0326872 | A1 | * | 12/2010 | Rivera et al. | 206/509 |

FOREIGN PATENT DOCUMENTS

| CH | 330 424 A | 6/1958 |
| CN | 2820721 Y | 9/2006 |

(Continued)

OTHER PUBLICATIONS

International Search Report dated Mar. 11, 2011, as issued in corresponding International Patent Application No. PCT/FR2012/000034, filed Jan. 27, 2012.

*Primary Examiner* — Robert J Hicks
(74) *Attorney, Agent, or Firm* — Maier & Maier, PLLC

(57) ABSTRACT

The invention relates to a modular receptacle formed by a plurality of axially-nestable necked containers. The neck of the containers includes a flange which cooperates with a recessed tubular chamber provided in the base of the containers. The flange is housed in the chamber, such that it is free to move radially, but bears axially against a shoulder in one direction. Bosses are provided on a flared section that extends from the neck and said bosses are received in cavities located in a flared pocket that extends from the above-mentioned chamber. The bosses and cavities form members that provide axial and radial stabilization for the nesting arrangement formed when the flange bears against the shoulder and they include inclined lateral-pressure-bearing ramps used to separate two assembled containers.

12 Claims, 7 Drawing Sheets

(56) References Cited

FOREIGN PATENT DOCUMENTS

| | | |
|---|---|---|
| DE | 3443423 A1 | 5/1986 |
| EP | 1 321 370 A1 | 6/2003 |
| FR | 2 621 013 A1 | 3/1989 |
| GB | 2 367 276 A | 4/2002 |
| WO | 2007/135292 A2 | 11/2007 |
| WO | 2009/024004 A1 | 2/2009 |

\* cited by examiner

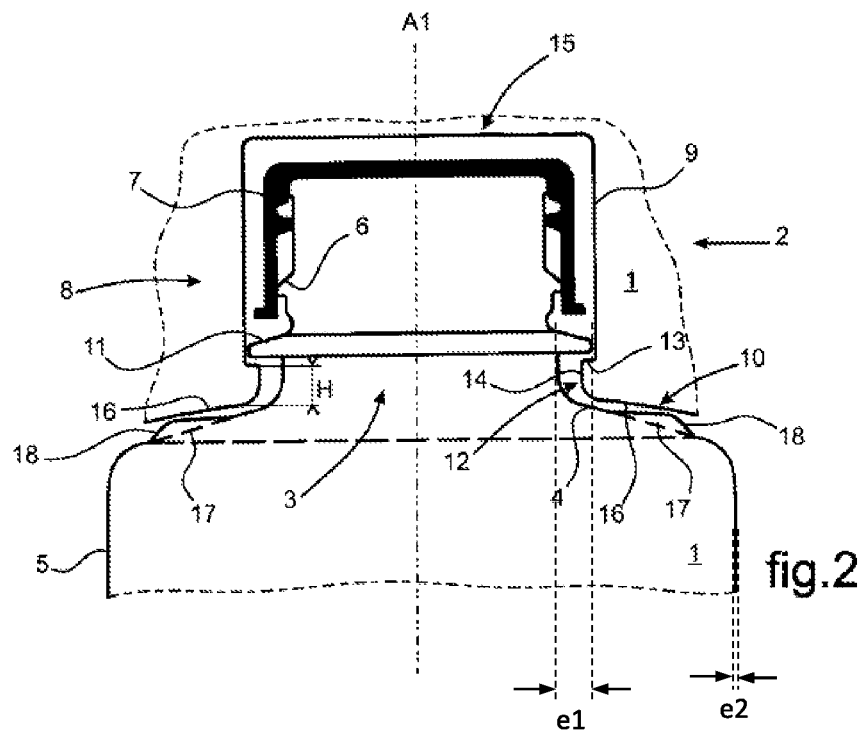
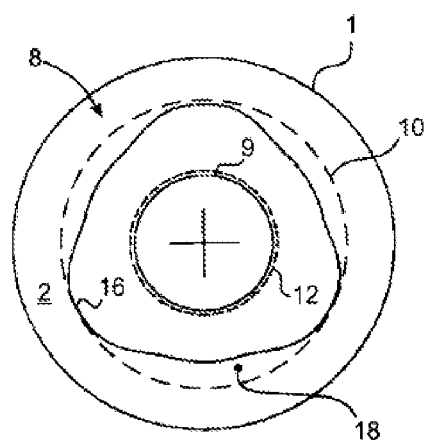
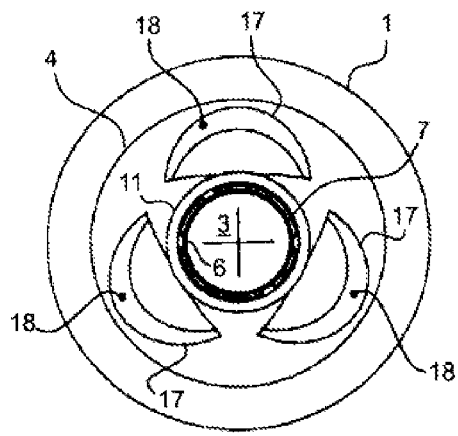
fig.2
fig.6  fig.5

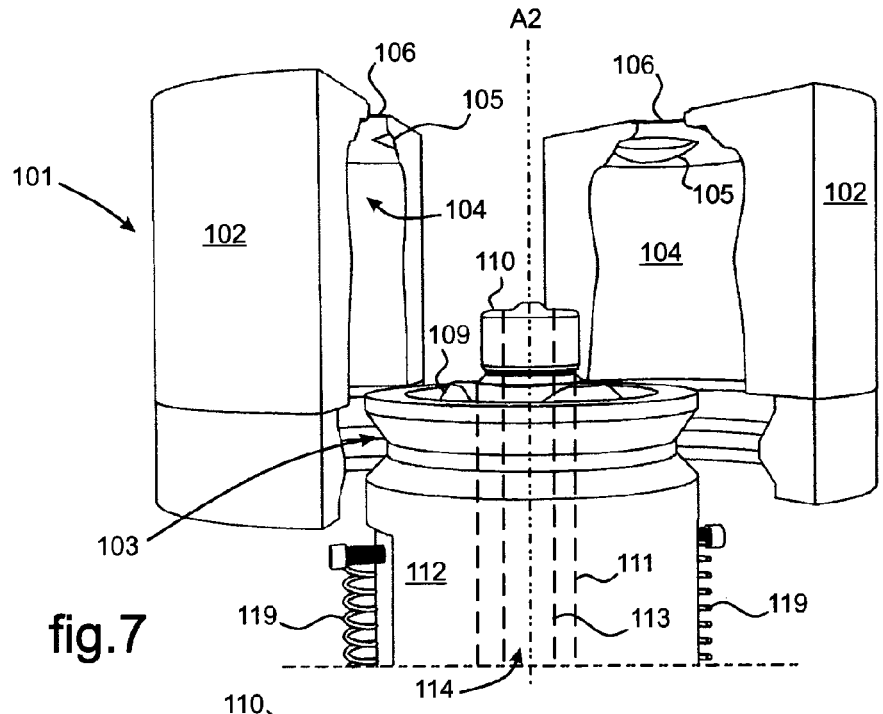
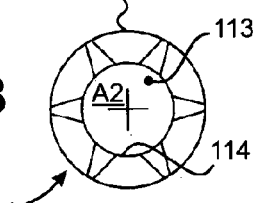 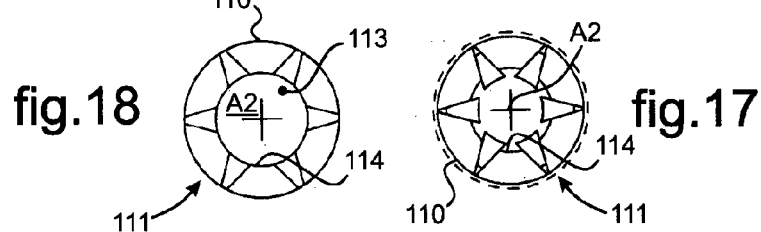
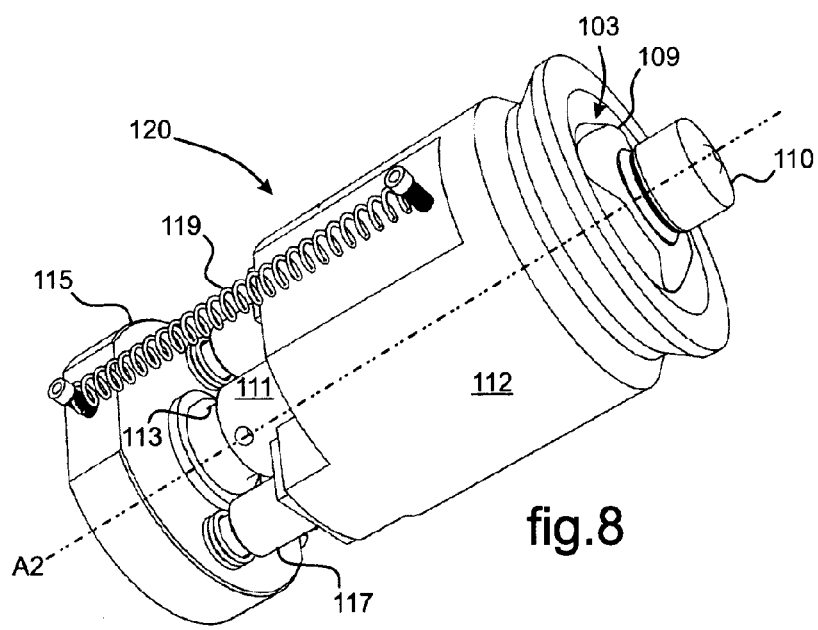

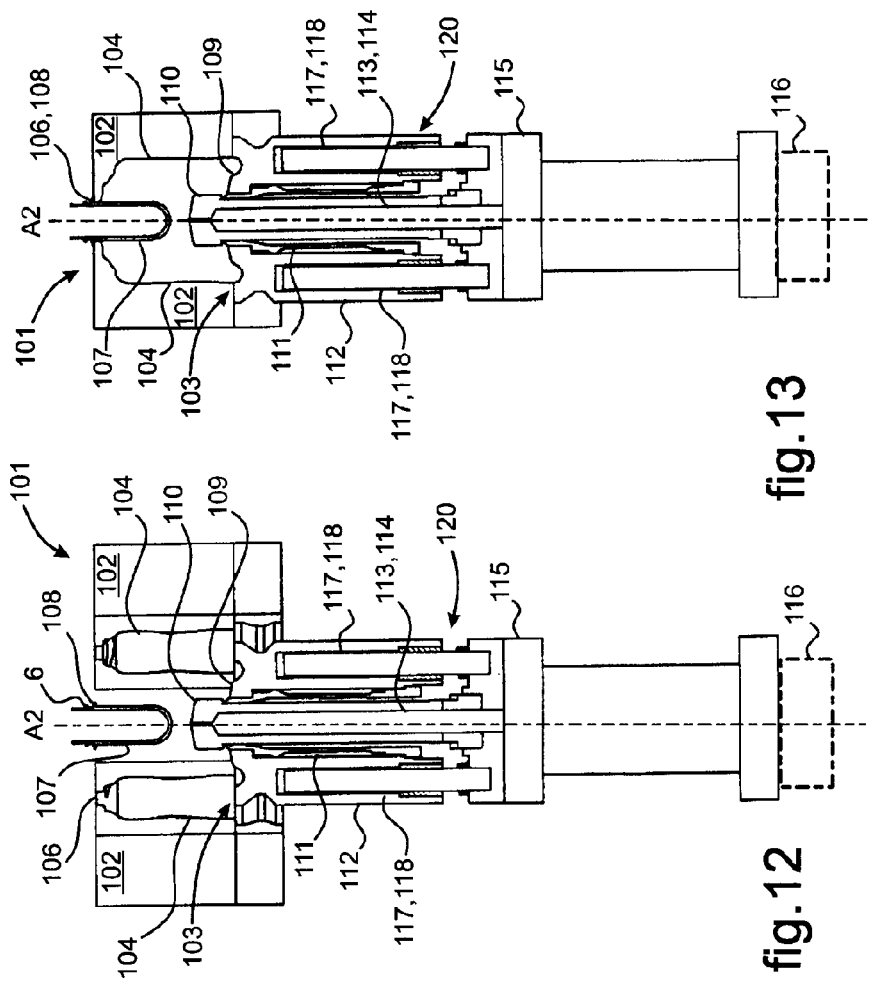
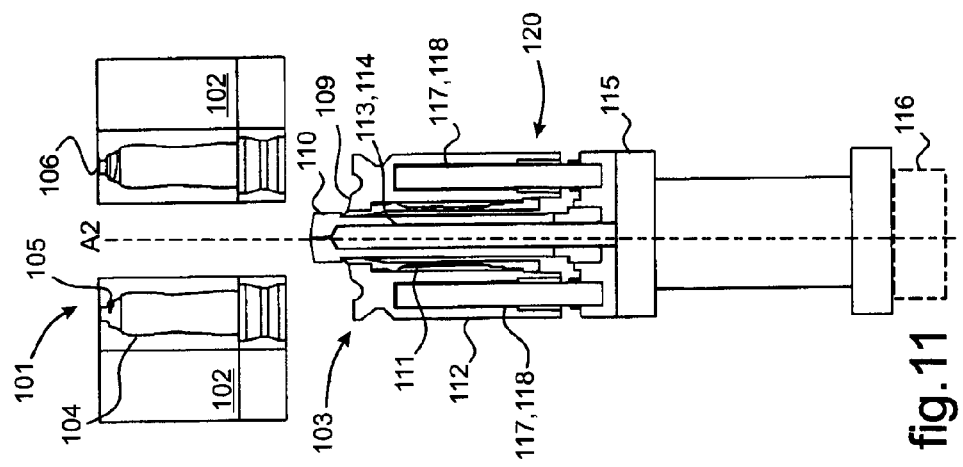
fig.13
fig.12
fig.11

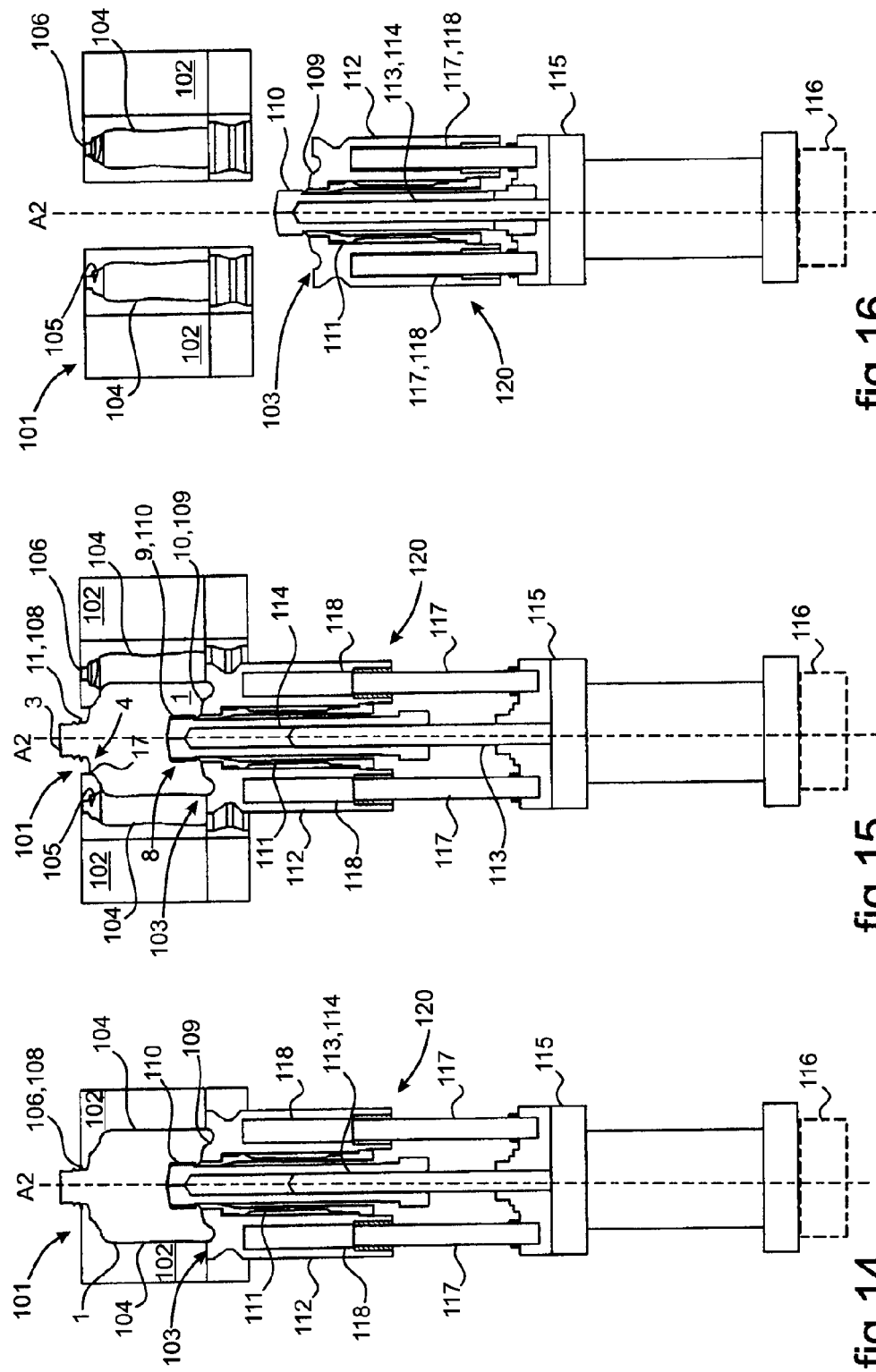

MODULAR RECEPTACLE FORMED BY A PLURALITY OF AXIALLY-NESTABLE CONTAINERS, AND METHOD FOR PRODUCING SUCH CONTAINERS BY MEANS OF THE BLOW-MOULDING OF A PREFORM

TECHNICAL FIELD OF THE INVENTION

The invention is of the field of blow-moulding using a preform, in order to manufacture a necked container comprising an undercut. The container is more particularly a module for a receptacle composed of a plurality of such containers, which are arranged for their axial junction to each other with the placing in cooperation between the base of a container and the neck of another container in the vicinity axially. It has for purpose a method of manufacture by blow-moulding a preform in order to obtain such a container comprising an undercut arranged in its base, and a receptacle composed of a plurality of containers manufactured using the implementation of this method.

PRIOR ART

Among the containers, necked containers are known which are arranged in a bottle or similar and which are intended to contain liquid products, beverages in particular. Such containers comprise at their proximal end a neck with tubular conformation, which is provided with means of junction easily reversible, by screwing in particular, with a removable cap. The neck is extended towards the distal end of the container by a flared section, then axially by a body which is closed at its base by a base arranged at its distal end. This base frequently comprises a cavity which is open towards the exterior and which is more preferably provided with radial reinforcement fins. Such an arrangement of the base makes it possible to rigidify the container of which the wall is desired to be as thin as possible, in order to prevent it from being deformed under the effect of the thrust exerted by the liquid that it contains, in particular in the case where the liquid is under pressure such as a carbonated beverage for example.

It is common to form such containers by blow-moulding by using a preform installed inside a mould. This moulding technique is advantageous for obtaining containers with a thin wall at least cost and at high production rates. The mould is primarily composed of at least two lateral shells and of a base. The shells are mobile laterally for the opening and the closing of the mould, and comprise at their top a member for taking a flange of which the preform is provided for its maintaining inside the mould during the operation of blow-moulding. The base of the mould is able to be axially mobile in order to form the open cavity that the base of the container comprises. Reference for example can be made to WO02098631 (GOMEZ CAO JOSE LUIS) which describes a method for the moulding of a necked container by blow-moulding a preform implementing such a mould.

Receptacles have been proposed composed of a plurality of necked containers that can be assembled axially with a placing in cooperation between the base of an upper container and the neck of a lower container. The base of the upper container comprises a cavity which houses the neck extended with the flared section of the lower container, with this cavity comprising a tubular space for receiving said neck which is extended by a flared pocket. The assembly between the upper container and the lower container is obtained by a placing in cooperation between cooperating members for axial nesting that the containers respectively comprise. In the assembly position of the containers, a member for nesting of the lower container is embedded inside a member for nesting of complementary shape that the upper container comprises. This embedding is obtained by elastic deformation of one and/or the other of the members for nesting, and prohibits a spontaneous separation of the containers under the effect of the weight of the lower container, in particular when the receptacle is carried by the intermediary of the upper container. In order to assemble or separate the containers, the operator exerts a force in order to provoke a deformation of one and/or of the other of the members for nesting and their placing in cooperation or inversely their disconnecting.

Reference can be made for example to EP1321370 (PICI A.), CN2820721 (WEN XIAODONG), WO2009/024004 (HUANG DEGU; DAI RENDE) and WO2007/135292 (BOU-MEZRAG M.), which describe such receptacles.

There is the problem of the antagonism between the quality of the assembly obtained between the containers, and the ease of their manipulation by an operator in order to obtain this assembly or inversely the separation of the containers. There is also the problem of reconciling the presence of the members for nesting with the presence of the removable caps of which each of the containers are equipped. It is to be taken into account that the solutions proposed must fall in line with the framework of manufacture at least cost and at high rates of speed of containers, which are in particular single-use food-grade consumable objects, having more preferably to be able to be formed with a minimum quantity of material. Such manufacturing constraints are surmounted by the implementing of the technique of moulding by blow-moulding a preform which comes from an inexpensive and easily recyclable food-grade thermoplastic material, polyethylene terephthalate (PET) in particular or other similar thermoplastic material. However, the containers obtained as such are fragile, which renders delicate their organisation and their faculty to procure their axial assembly between them in order to comprise a modular receptacle. The phenomena of shrinking material proper to the moulding technique by blow-moulding a preform and the constraints linked to the forming of a container with a thin wall of thickness that is as homogenous as possible are also to be taken into account. In order to limit the costs of obtaining containers and allow them to be manufactured at high rates of speed, it is also desirable to favour their individual manufacture in a single operation of blow-moulding using a preform with any arrangement, of the type of those that exist which are commonly marketed in the field of blow-moulding and which are advantageously provided with standard means that are compliant with the habitual way of taking by screwing of the cap. The forming of the members for nesting during the manufacture of the container induces the presence of one or of several undercuts that have to be taken into account.

According to EP1321370, CN2820721 and WO2009/024004 for example, the members for nesting that the containers comprise associate a peripheral bead that the lower container comprises, with a groove arranged in the cavity that the upper container comprises. The nesting is carried out by embedding of the bead inside the groove, using an axial thrust exerted by the operator on the lower container towards the upper container. This axial thrust induces the deformation and the crossing of the distal edge of the groove by the bead until it is thrust against the proximal edge of the groove and its clamping to the inside of the latter. The separation of the containers is obtained using an axial traction deforming the distal edge of the groove until the extraction of the bead. In the framework of the manufacturing constraints that have been mentioned, such containers are delicate to obtain and their axial assembly is not reliable. CN2820721 and WO2009/024004 propose to supplement the embedding of the bead inside the groove with means for locking of the axial nesting carried out, such as by screwing, which complicates the modalities of moulding containers and/or makes it impossible to form them with a thin wall obtained by blow-moulding a preform made of PET. As a further example and according to WO2007/135292, the members for nesting that the containers comprise are formed of ramps cooperating by axial bearing and comprising end-of-travel stops. The manipulation of the containers by the operator for their assembly or inversely their separation is comfortable and the nesting obtained is satisfactory, but the obtaining of the containers by blow-moulding a preform made of PET in the framework of the manufacturing constraints that have been mentioned, is delicate and even impossible.

The structure of the container, and more particularly the material of which it comes from, the thinness of its wall and the modalities provided for its axial nesting with another similar container, must be compatible with its manufacture via moulding using the advantageous technique of blow-moulding using a preform in order to manufacture objects with an undercut, in the framework of the constraints that have been mentioned.

PURPOSE OF THE INVENTION

This invention has for purpose a modular receptacle composed of necked containers comprising modalities for axial nesting into one another by placing in cooperation between their base and their neck, which are reliable and comfortable to implement. This axial nesting between the containers is desired to be able to be procured despite their advantageous manufacture at least cost and at high rates of speed by blow-moulding a preform made of thermoplastic material able to be a PET, despite the thinness of their wall desired to be as thin as possible through saving material, and despite the presence of an undercut useful for the forming of a member for nesting that the containers comprise.

This invention further has for purpose a method of manufacture via moulding a container with undercut by blow-moulding a preform, of which the implementation is compatible with the obtaining of a container with a thin wall which is organised in order to allow for reliable and comfortable axial nesting of it with a similar container in order to comprise the modular receptacle. Such a container is desired to be able to be formed using an inexpensive and easily recyclable food-grade thermoplastic material, polyethylene terephthalate (PET) in particular or other similar thermoplastic material, with a wall as thin as possible.

This invention aims in particular to propose such a container and method in the framework of the constraints that have been mentioned, taking into account the compatibility between the structural organisation of the container and the manufacturing modalities implemented in order to obtain these containers at least cost and at high rates of speed.

The invention consisted as a whole in simplifying the structural arrangement of the containers comprising the modular receptacle, in particular with regards to the modalities implemented for their axial nesting one into the other, by reducing this arrangement to an axial bearing in one direction with radial freedom between cooperating members for nesting that include respectively these containers. This axially bearing in one direction excludes a radial engagement between the members for nesting, which are reduced respectively to a flange arranged around the neck of the cooperating containers by axially bearing in one direction and radial freedom with a shoulder arranged at the base of a blind tubular chamber that a cavity arranged at the base of the containers comprises as an undercut.

The manufacture by blow-moulding of containers using the technique of blow-moulding a preform is implemented at least cost and at high rates of speed. The manufacturing constraints linked to the technique of blow-moulding, such as the phenomena of withdrawal, the structure of the mould desired to be simple and the respective operations of forming members for nesting are dissociated between the forming of the wall of the container, the forming of the cavity as an undercut and the forming of the flange.

The chamber is obtained by means of a mould of which the structure allows for its implementation at high rates of speed using relative axial displacements between members mounted on the mould. The cavity is formed using a pocket that a base of the mould comprises, which is mounted axially mobile in order to form a tubular chamber extended by a flared pocket. The chamber is moulded as an undercut using a relative axial displacement between a piston and a retractable member mounted jointly mobile with the base and inside of which the piston circulates. This retractable member is provided with a radially expandable head which can be manoeuvered by the piston and which emerges as an axial extension of the wall of the pocket forming the flared pocket. The relative displacements between the piston and the retractable member are implemented using the mobility on the mould of a unit composed of the base, of the retractable member and of the piston, and by means of elastic recalling which are interposed between the piston and a frame bearing the assembled base and the retractable member. The number of moulding operations successively implemented is reduced and the kinematics of the mobile members to be displaced is simple.

The radial dimensions of the flange can be of any dimensions, as only its thickness is useful in the reliability of the nesting obtained between two containers axially assembled to one another. A standard ring for taking that the preforms commonly comprise for their maintaining inside the mould is able to be advantageously used in order to form the flange. The implementation of a specific operation of forming of this flange around the neck is avoided. The flange is robust by being of a thickness that significantly more substantial that the thickness of the wall of the container, which can be obtained thin using an inexpensive and easily recyclable food-grade thermoplastic material, such as PET or other similar thermoplastic material, used in a small quantity.

The face of the pocket arranging the flared pocket can comprise reliefs for moulding cavities for receiving bosses that the flared section of another container comprises. Such cooperating cavities and bosses are used to strengthen the axial and radial stability of the nesting between two containers and in order to form ramps that generate an axial force of separation of the assembled containers using a relative rotating movement between these containers easily operated by the user. The organisation and the moulding that are proper to these reliefs are dissociated from those of the members for nesting which are respectively arranged on the neck and in the cavity of the containers.

The shoulder constitutes a radially and axially extended member which is arranged at the base of the chamber opposite its blind surface and which is able to procure an robust obstacle to a spontaneous withdrawal of a flange arranged on the neck of a neighbouring container, including in the case of a container comprising a thin wall formed using an easily recyclable food-grade plastic material, such as PET or other similar material. The robustness of the shoulder is determined by its axial extension, which can be easily adapted according to the needs independent of the thickness conferred to the flange.

According to an embodiment, the radial extension of the shoulder is more preferably constant, with its free edge being geometrically continuous along a circumference. According to an alternative, the radial extension of the shoulder is variable, with its free edge having a toothed conformation, in order to facilitate the arrangement of a radially expandable head of formation via moulding as an undercut of the chamber and in order to adapt as needed the local deformability of the shoulder procuring the nesting and the separation between two containers.

The nesting between two containers is easily carried out by a user using an axial thrust which provokes an elastic deformation of the shoulder, the inverse operation of separation between the containers being assisted using cooperating bosses and cavities. The radial dimensions of the shoulder and of the flange can be separate from one another when the radial dimension of the annular chamber is greater than that of the flange that it receives radially free. The radial extent of the chamber is dissociated from the constraints of reliability and of robustness of the axial nesting to be obtained between two containers to be assembled. The radial extension of the chamber can be freely adapted according to the passage required for the reception of a neck provided with a standard cap of another container.

More particularly according to a first aspect of this invention, the latter has for purpose a modular receptacle composed of a plurality of necked containers axially nestable successively one into the other, with placing in cooperation between their base and their neck extended by a flared section. The containers comprise members for axial nesting with a neighbouring container. The at least one of the members for nesting is arranged as a flange which is arranged around the neck of a container, and at least one other is arranged as a recess for receiving the flange, recess which comprises a cavity open onto the exterior which is arranged in the base of a neighbouring container. This cavity comprises a blind tubular space for receiving a neck, which is extended by a flared pocket for receiving the flared section extending the neck.

According to this invention, such a container is primarily recognisable in that the recess for receiving the flange is formed by the tubular space for receiving the neck, which is arranged as an undercut in the base of the container. This tubular space arranges a chamber for receiving the flange with radial freedom and bearing axially in one direction against a shoulder formed at the base of the chamber opposite its blind surface.

The modalities for the assembly between the containers of the receptacle are structurally simple and exclude a putting into engagement by clamping of the flange via the recess that receives it. The modalities of moulding containers by blow-moulding a preform are not affected by the implementing of complex operations specific to the forming of the members for nesting, with the recess for receiving the flange being arranged using the forming as an undercut of the chamber. The member for nesting that cooperates with the flange is formed of the shoulder, which is obtained by moulding folds of the wall of the container around a pocket, and more particularly around a radially expandable head that a retractable member for moulding of the undercut comprises. Despite the radial and axial freedom of movement between the flange and the chamber, the axial bearing engagement that the flange takes against the shoulder procures a nesting between the containers which is reliable and robust. The arrangement of the shoulder by folds of the wall of the container make it possible to confer it an axial extension that confers it with its robustness without increasing the thickness of the wall of the container which can be thin. This arrangement of the shoulder authorises its deformation under the effect of an axial thrust operated on the containers by an operator. The robustness desired of the shoulder can be easily adapted for any containers whatsoever, using a variation of its axial extension which can be easily obtained by varying the emergence of the radially expandable head outside of the pocket arranging the flared pocket. The thickness of the flange is independent of the axial extension of the shoulder, and can be more substantial than the thickness of the wall of the container obtained. The flange can be arranged by moulding around the neck of the container during its forming via blow-moulding, or and more preferably be advantageously constituted by a ring for taking by the mould of the preform with which the container is formed by blow-moulding, or by a ring arranged at the base of a removable cap provided on the container. The radial extensions of the flange and of the shoulder are dissociated and that of the neck provided with any cap whatsoever, when the passage of the neck provided with the cap towards the chamber is authorised.

The container can be with a thin wall of constant thickness by being moulded by blow-moulding a preform, and be made of an inexpensive and easily recyclable food-grade thermoplastic material, polyethylene terephthalate (PET) in particular or other similar thermoplastic material, without affecting the duality of the axial nesting obtained between two containers in order to comprise the receptacle.

According to a preferred embodiment, the flange is solid and is of a thickness that is significantly greater than that of the wall of the container delimiting its interior volume, by being for example advantageously formed of a ring for taking a preform from which is moulded the wall of the container by blow-moulding of a thermoplastic material.

The shoulder is in particular formed by the wall of the container using a plurality of successive inflections of this wall inducing its fold, which arrange a seat for bearing the flange extended by a spacer with a generally axial extension of separation between the seat and the flared pocket.

The containers incorporate in particular means for relative immobilisation between two assembled containers, which associate an antagonistic axial bearing of the containers between the flange against the shoulder and the flared section against the flared pocket, and a radial bearing engagement between reliefs cooperating axially extended that respectively the flared section and the flared pocket comprise.

More particularly, the flared section and the flared pocket comprise more preferably cooperating members of radial stabilisation of the nesting between two assembled containers, against a radial freedom of movement of the flange inside the chamber.

More particularly, the flared section and the flared pocket comprise more preferably cooperating members of lateral bearing that generate an axial force between two assembled containers, under the effect of a relative rotating force operated between these containers by an operator. The operation of separation of assembled containers is operated comfortably despite the robustness of the bearing of the flange against the shoulder, using a relative rotating movement between the containers carried out by the user.

According to an advantageous embodiment, the members for stabilising, the members for lateral bearing and the cooperating reliefs are confounded, by being formed respectively by at least one boss arranged on the flared section of a container which cooperates with a cavity arranged in the flared pocket of a neighbouring container. The placing in cooperation between the boss and the cavity procures a radial stabilisation and an axial blocking of the nesting between two assembled containers, and a comfort for manoeuvring assembled containers by an operator for their separation. The cooperating bosses and the cavities are more preferably as a plurality by being radially distributed.

According to a preferred conformation of the contact surfaces between the boss and the cavity, the latter are transversally arched and arrange antagonistic lateral pressure-bearing ramps which are axially extended by being inclined in relation to the axis of general extension of the containers. For the purposes of information, the ramps are inclined in relation to the axis of general extension of the containers by an angle between 30° and 75°, and more specifically between 45° and 60°, according to the flaring slopes of the section and of the pocket.

More preferably, the neck comprises at its free end means of junction easily reversible with a removable cap, such as screwing in particular or by clip-fastening for example. Such caps and means of junction are in particular those commonly used in the field of necked containers and more particularly those commonly implemented in the framework of moulding of necked containers by blow-moulding using a preform.

According to a particular embodiment, the flange is formed by a ring arranged at the base of the cap, joined to the neck of the container.

According to a second aspect of this invention, the latter has for purpose a method for moulding a necked container by blow-moulding, using a preform made of thermoplastic material and implementing a mould with a generally axial orientation. The mould comprises:
  shells which are mounted mobile laterally around an axis of general orientation of the mould and which are provided with a member for taking the preform by the intermediary of a ring that it comprises,
  a base which is mounted axially mobile along the axis of general orientation of the mould and which is provided with means for forming, in the base of the container to be obtained, a cavity with undercut open towards the exterior. The means for forming the cavity associate a pocket arranging the cavity and a retractable member for forming the undercut, which can be manoeuvered between a deployed position of moulding the undercut and a retracted position authorising the demoulding of the necked container obtained.

The method implements a moulding cycle of the necked container which comprises at least the following operations:
  installation of the preform inside the mould and closing of the mould by bringing shells and the base closer to one another,
  blow-moulding of the preform in order to form the wall of the necked container to be obtained,
  opening of the mould and demoulding of the necked container obtained by separating shells and the base from one another, and
  operations for manoeuvering the retractable member between its deployed and retracted positions which are implemented respectively prior to and following the operation of blow-moulding.

According to this invention, such a method for moulding comprises specific operations of placing in relative displacement along the axis of general orientation of the mould between the base and a piston circulating inside the retractable member provoking its passing between its deployed and retracted positions. More particularly, the operations of manoeuvering the retractable member between its deployed and retracted positions are provoked by the respective operations of placing in relative displacement along the axis of general orientation of the mould between the base and a piston circulating inside the retractable member. These operations of placing in relative displacement between the piston and the base alternatively provoke the expansion and inversely the radial retractions of a head with a generally cylindrical conformation that the retractable member comprises. This head arranges by moulding in the base of the container to be obtained a blind tubular chamber as an undercut that the cavity comprises.

Using a relative axial displacement between the base and the piston, the head of the retractable member forms a member for joint moulding of the chamber and of a member for nesting able to cooperate with an additional member for nesting that the neck of a similar container comprises. The axial mobility of the piston makes it possible to easily incorporate the operations of placing in relative displacement between the piston and the base in the moulding cycle of the container, and the joint forming of the chamber and of the member for nesting which is constituted by the shoulder that the chamber comprises as an undercut at its base opposite its blind surface. The operation of forming the chamber associated with the forming of this member for nesting is dissociated from the operation of forming a flared pocket that the cavity arranged at the base of the container obtained comprises and which is moulded by the face of the pocket reserved for this purpose. The separate manoeuvers, during the moulding cycle of the container, between the means for forming the flared pocket and the chamber as an undercut, make it possible to simplify the moulding cycle and the modalities to be implemented in order to comply with the dimensions and manufacturing tolerances proper to the flared pocket and to the chamber. The piston, the retractable member and the base can be mounted on the same unit mobile axially and which can be manoeuvred during the operations of closing and/or of opening of the mould, a relative axial displacement between the base assembled to the retractable member and the piston for manoeuvering this retractable member between its deployed and retracted positions able to be easily implemented in the moulding cycle with high rates of speed. The means that comprise the device for moulding in order to form the member for nesting that comprises the cavity of the containers are structurally simple to implement and are able to withstand sustained rates of speed by limiting the maintenance operations and the risks of a breakdown.

The moulding cycle comprises in particular the following operations:
  prior to the operation of closing the mould, an initial step of relative displacement between the piston and the base assembled to the retractable member to a moulding position, provoking the radial expansion of the head,
  following the operation of blow-moulding and prior to the operation of opening the mould, an intermediate step of relative displacement between the piston and the base assembled to the retractable member to a demoulding position, provoking the radial retraction of the head.
More particularly,
  the intermediate step is an operation for manoeuvering the piston to a cleared situation outside of the mould, with the base assembled to the retractable member being maintained in closed position of the mould. In cleared situation, the piston is withdrawn from the space delimited between the shells.
  the initial step is an operation for manoeuvering the base and the retractable member concurrent to the operation of opening the mould.

According to an advantageous embodiment, the operation of closing the mould comprises a delivery, towards the shells and along the axis of general orientation of the mould, jointly with a mobile unit composed of the base, of the retractable member and of the piston in moulding position wherein the head is expanded. The intermediate step associates a manoeuvre of the piston into cleared situation with a retaining of the base and of the retractable member imprisoned by the shells, into demoulding position wherein the head is retracted. The operation of opening the mould induces a joint spontaneous releasing of the base and of the retractable member outside of the shells, and their joint displacement into moulding position wherein the head is expanded.

The method further comprises an operation of forming a flange around the neck of the container to be obtained. This flange is a member for nesting cooperating with the shoulder arranged at the base of the chamber opposite its blind surface that another similar container comprises. The operation of forming the flange is advantageously carried out by moulding of the preform following its installation inside the mould and the operation of blow-moulding forming the wall of the container. More particularly, this operation of forming the flange corresponds to an operation of forming on the preform of the ring with which it is provided in order to cooperate with the member for taking that the shells comprise for their maintaining inside the mould.

This invention also has for purpose a device for the manufacture of a necked container by blow-moulding using a preform made of thermoplastic material. This device is organised in order to implement a method such as has just been described, by being structurally simple, reliable, sustainable and easy to implement with sustained rates of speed.

This device comprises an installation frame of the mould, whereon this frame a mobile unit carrying the base is mounted mobile in translation along the axis of general orientation of the mould by motorised means of manoeuvring. According to an advantageous arrangement of this device, the mobile unit comprises:
  a base bearing the piston,
  a frame jointly bearing the base and the retractable member, whereon this frame are assembled the base axially passed through by the retractable member,
  means of relative mobility between the base and the frame along the axis of general orientation of the mould. These means of mobility include in particular means for guiding in translation along the axis of general orientation of the mould, which are interposed between the base and the frame. These means of mobility further include means for relative displacing between the frame and the base between said positions of moulding and of demoulding.

According to an advantageous embodiment of the means for guiding, the latter include at least one column borne by the base cooperating with a socket incorporated into the frame. More preferably, the columns are of a number of at least two and are radially distributed on the base, by extending parallel to the piston.

The means for displacing between the frame and the base advantageously include:
  said motorised means of manoeuvring the mobile unit used for the closing of the mould, which are engaged on the base bearing the frame by being alternatively able either to provoke a joint displacement of the base and of the frame in closed position of the mould, with the piston provoking the placing into deployed position of the corresponding retractable member to the moulding position wherein the head is expanded, or to provoke a displacement of the base to the cleared situation of the piston in demoulding position while the frame is retained imprisoned by the shells in closed position of the mould,
  means of recalling with antagonistic engagement on the frame and the base, which are able to provoke a displacement of the frame in moulding position as a consequence of its release by the shells manoeuvred into open position of the mould.

According to an advantageous embodiment, the base of the mould associates:
  a wall for moulding the flared pocket open towards the exterior, which the cavity comprises to be moulded in the base of the container to be obtained,
  the radially expandable head of the retractable member, which emerges axially outside of the wall for moulding and which constitutes a member for moulding in the base of the container to be obtained, of the blind chamber which extends as an undercut the flared pocket. The retractable member and/or the expandable head that it comprises are able to be provided with means of adjusting the position of emergence of the head outside of the wall of the moulding in order to adapt the axial extension of the shoulder.

This invention also has for purpose a necked container axially nestable with another similar necked container. This necked container is manufactured by implementing a method and by means of a device such as just have been described. The container comprises in its base a cavity open onto the exterior associating a flared pocket extended by a blind tubular space able to axially house the neck extended by a flared section that a similar neighbouring container comprises. The container is furthermore provided with members for nesting for its axial assembly with at least a similar container, which are respectively arranged for at least one in a flange arranged around the neck of the containers and for at least one other by a recess for receiving this flange arranged in the cavity.

This receptacle is primarily recognisable in that the tubular space is arranged as a chamber as an undercut forming at its base opposite its blind surface a shoulder for the axially bearing in one direction with radial freedom against a flange arranged around the neck of a similar container.

The flange is advantageously formed of a peripheral ring that the neck comprises. According to respective alternative embodiments, this ring is advantageously constituted of a ring for taking a preform from which results the container moulded by blow-moulding of this preform, or is advantageously constituted of a ring arranged at the base of a removable cap which is added onto the neck of the container by the intermediary of means of junction that are easily reversible, by screwing and/or by clip-fastening in particular.

It is understood that the invention is applicable to any necked container and to any method of obtaining such a necked container regardless of the content which is intended to be conditioned inside the container, and regardless of the material of which it is made although the provisions of the invention are particularly adapted to the forming of necked containers with a thin wall made of inexpensive food-grade easily recyclable thermoplastic material, such as PET.

DESCRIPTION OF THE FIGURES

Example embodiments of this invention shall now be described in relation with the figures of the annexed plates, wherein:

FIG. 2 is a detail of the receptacle shown in FIG. 1, showing the placing in cooperation between the base of a container and the neck of a neighbouring container.

FIG. 5 and FIG. 6 show the end of the container shown in FIG. 3 and FIG. 4, respectively seen from its neck and from its base.

FIG. 7 shows in perspective a mould used in order to form by blow-moulding a preform a container shown in FIG. 3 to FIG. 6.

FIG. 8 to FIG. 10 show respectively in perspective and as lateral views a mobile unit that comprises a device used for the moulding of a container shown in FIG. 3 to FIG. 6.

FIG. 11 to FIG. 16 are drawings that successively show a method for the moulding by blow-moulding a preform of a container shown in FIG. 3 to FIG. 6.

FIG. 17 and FIG. 18 show as a transversal cross-section an expandable head from moulding respectively in retracted position and in expanded position, for the forming of an annular chamber as an undercut that a container shown in FIG. 3 to FIG. 6 comprises.

In FIG. 1, a modular receptacle is composed of a plurality of similar containers 1 which are successively axially assembled to one another, with placing in cooperation between the base 2 of a container 1 and the neck 3 of a neighbouring container 1. According to their axis of general extension A1, each of the containers 1 comprises from its proximal end to its distal end the neck 3 extended by a flared section 4, then an axial extension 5 of which the distal end is closed by the base 2. The necks 3 are provided with means of junction 6 easily reversible with removable caps 7, and the bases 2 each comprise a cavity 8 for receiving the neck 3 extended by the flared section 4 of a neighbouring container 1. The cavity 8 is composed of a blind tubular chamber 9 for receiving a neck 3, which is extended by a flared pocket 10 for receiving a flared section 4 extending the neck 3.

In FIG. 2 to FIG. 4, the assembly between two neighbouring containers 1 is carried out via nesting, by means of a flange 11 which is arranged around the neck 3 of the containers 1, and which cooperates with a shoulder 12 arranged at the base of the chamber 9 opposite its blind surface 15. Two containers 1 are axially assembled by a crossing by force of the shoulder 12 by the flange 11, suing an axial thrust exerted by the operator from one to the other of the containers 1. The shoulder 12 is formed using successive folds 13, 14 of the wall of the container 1, which arrange a seat 13 for axial bearing in one direction for the flange 11. This seat 13 is extended by an axial extension H of the shoulder 12, which forms a spacer 14 between the seat 13 and the flared pocket 10 arranged as an extension of the chamber 9. The axial thrust exerted by the operator induces a deformation of the shoulder 12 in the corresponding zones of inflection of the wall of the container 1, with this deformation authorising the passing of the flange 11 until it is received inside the chamber 9. The flange 11 is housed in the chamber 9 by being radially free and axially free according to the direction opposite that of the bearing that it takes spontaneously via gravity against the shoulder 12. In the example embodiment shown, the flange 11 is formed by moulding around the neck 3, by being advantageously constituted of a ring for taking via a mould for forming of the container 1 by blow-moulding, that a preform comprises from which results the container 1. Such a ring used to constitute the flange 11, is of a thickness e1 that is significantly thicker than that e2 of the wall of the container 1 obtained using this preform. For the purposes of information, the proportion of the difference in thickness between the thickness e2 of the wall of the container 1 and the thickness e1 of the flange 11 is of a magnitude between 5 and 10.

Figure 1:
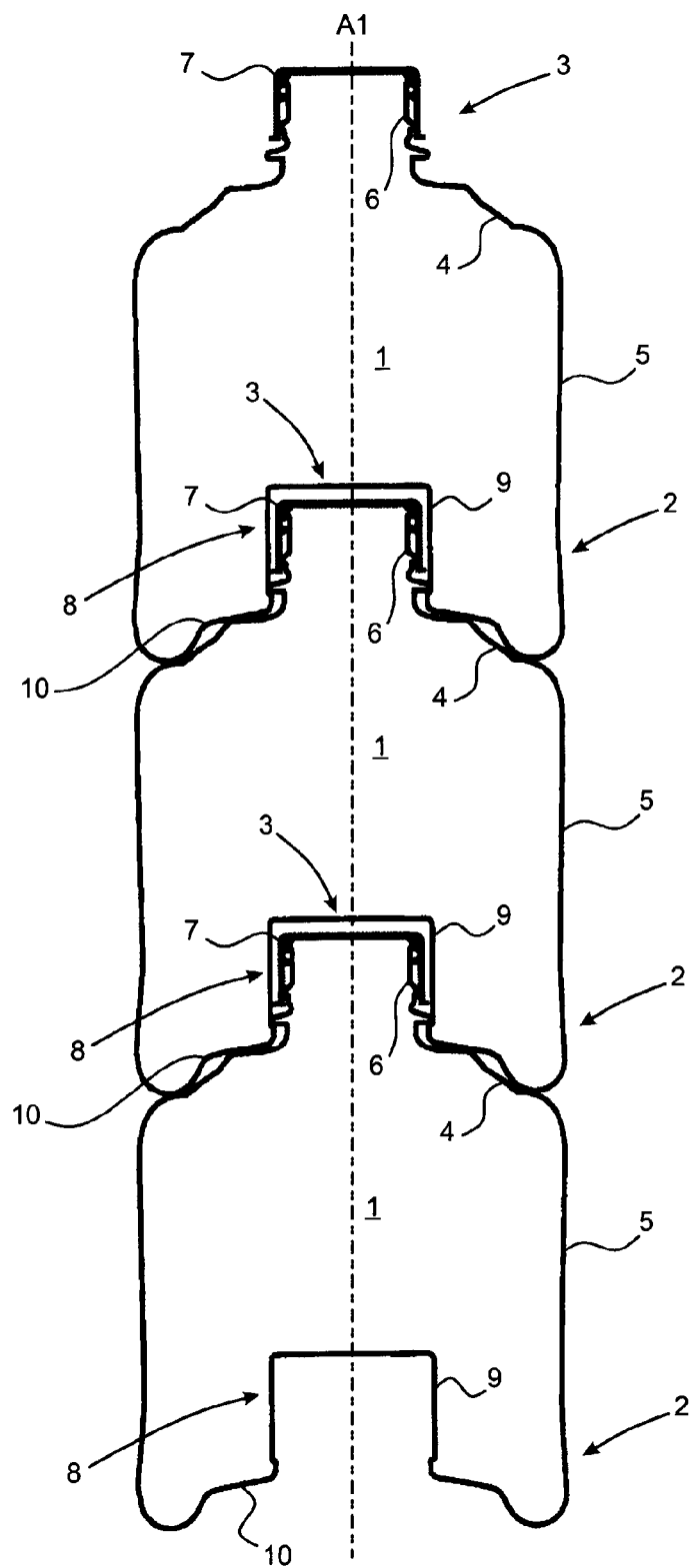
FIG. 1 shows as an axial cross-section a modular receptacle composed of a plurality of containers axially assembled together by nesting.

According to another alternative embodiment of the flange 11 also aiming to simplify the modalities for forming the flange 11 around the neck 3, the latter is able to be formed by a ring arranged at the base of the cap 7.

On FIG. 3 to FIG. 6 the axial nesting obtained by placing in cooperation between the flange 11 and the shoulder 12 is locked by antagonistic axial bearing engagements and a radial bearing engagement that two assembled containers 1 take against one another. The flared pocket 10 that the cavity 8 comprises of the containers comprises cavities 16 for receiving bosses 17 that the flared section 4 of the containers 1 comprises. When two containers 1 are assembled, the axially bearing in one direction that takes the flange 11 against the shoulder 12 is antagonistic to the axial bearing in one direction that the flared section takes against the flared pocket, and more particularly the bosses 17 against the cavities 16 that they respectively comprise. The placing in cooperation of the bosses 17 inside cavities 16 prohibits a spontaneous rotation of the two containers 1 between them, against the axial freedom of movement of the flange 11 housed inside the chamber 9. The contact surfaces between the bosses 17 and the cavities 16 are of arched transversal conformation, such as in half-moon in the example shown, and are arranged as a ramp 18 that is axially inclined in relation to the axis A1 of general extension of the containers 1, such as an angle B of a magnitude between 45° and 60°. The axial bearing that the flange 11 takes against the shoulder 12 is desired to be as robust as possible, and at the very least sufficient to prevent a spontaneous separation between two assembled containers 1 under the effect of the weight of a lower container 1 of the receptacle. In order to provoke the crossing of the shoulder 12 by the flange 11, the operator can easily exert an axial force by relative thrust between the containers 1 to be assembled. The inverse axial force to be provided in order to separate the containers 1 is more delicate to carry out by the operator. The arched conformation and the inclination of the contact surfaces between the bosses 17 and the cavities 16 make it possible to induce such an inverse axial force using a relative rotating movement between the containers 1, which can be comfortably carried out by the operator.

Figure 3:
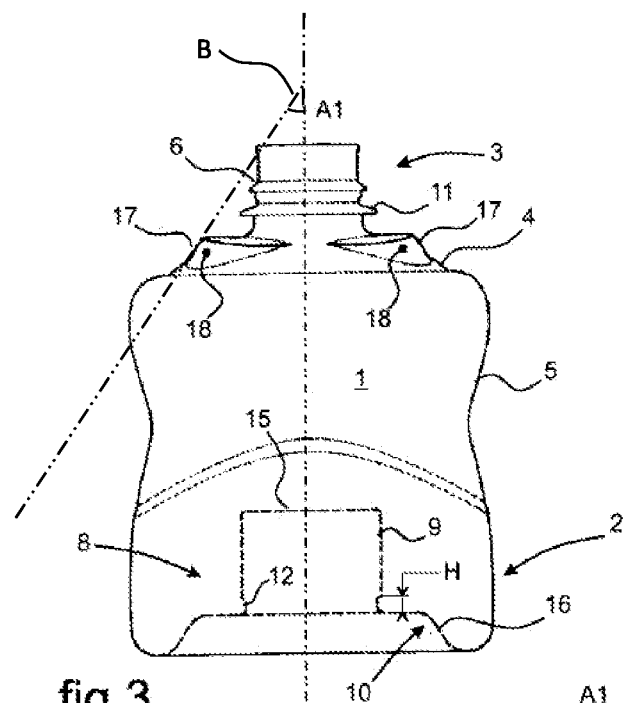
FIG. 3 and FIG. 4 respectively show as a profile and as an axial cross-section a container that the modular receptacle shown in FIG. 1 comprises.
Figure 4:
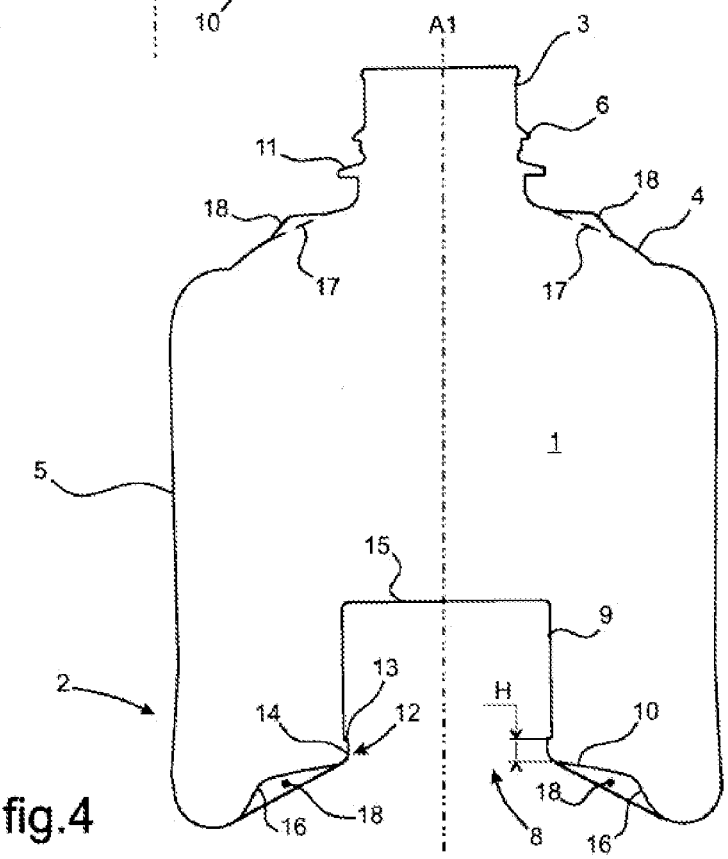

In FIG. 7 to FIG. 16, a device is arranged to mould a container shown in FIG. 3 and FIG. 4, by blow-moulding a preform installed inside a mould 101 more particularly shown in FIG. 7. This mould 101 comprises shells 102 which are mounted laterally mobile around an axis A2 of general orientation of the mould 101 in correspondence with the axis (A1) of general extension of the container 1 to be obtained, and a base 103 which is mounted axially mobile along this axis A2 of general orientation of the mould 101. The shells 102 each comprise a hollow pocket 104 delimiting a half-wall of the container 1 to be obtained. Cavities 105 for the moulding of the bosses 17 on the flared section 4 of the containers 1 to be obtained, are arranged in the corresponding zone at the top of these hollow pockets 104. The shells 102 comprise at their top a rebate 106 or similar member for taking and maintaining a preform 107 inside the mould 101, by the intermediary of a ring 108 that the preform 107 comprises for this purpose. The base 103 is provided with means for forming the cavity 8 in the base 2 of the container 1 to be obtained, which associate a pocket in relief forming a wall for moulding 109 of the flared pocket 10 and of the cavities 16 for receiving bosses 17, with a radially expandable head 110 for moulding the chamber 9 as an undercut. The radially expandable head 110 emerges axially outside of the wall of moulding 109, and is a component of a retractable member 111 which is mounted together with the base 103 on a common frame 112.

The retractable member 111, and more particularly the head 110 that it comprises, can be manoeuvred by a piston 113 using a relative displacement between the retractable member 111 and the piston 113. The retractable member 111 is arranged as a tube which is mounted on a frame 112 by being oriented along the axis A2 of general orientation of the mould 101 and by axially passing through the base 103. The arrangement as a tube of the retractable member 111 arranges an axial channel 114 for the circulation of the piston 113, in order to provoke its passing between its retracted and deployed positions. In retracted position of the retractable member 111, the expandable head 110 is retracted in a demoulding position such as illustrated on FIG. 17; in deployed position of the retractable member 111, the head 110 is expanded by being axially passed through by the piston 113 in a moulding position, such as is shown in FIG. 18. The piston 113 is carried by a base 115 that can be displaced by motorised means of manoeuvring 116, such as an electric cylinder or similar driving member. These motorised means of manoeuvring 116 are used to move the base 103 between the opening and closing positions of the mould 101, and more particularly to move the mobile unit 120 composed of the base 115 bearing the frame 112, which itself carries the base 103 and the retractable member 111 that is passes through axially. The base 115 is provided with columns 117 for the axial guiding of the frame 112 bearing the base 103 and the retractable member 111, which cooperate with sockets 118 arranged in the frame 112. Means of deformable recalling 119 are interposed between the frame 112 and the base 115, whereon they are in antagonistic engagement. Such means of recalling 119 are able to be constituted of springs, of pneumatic cylinders or of any other member for retaining against a relative displacement between the frame 112 and the base 115 beyond a predetermined constraint threshold.

Figure 10:
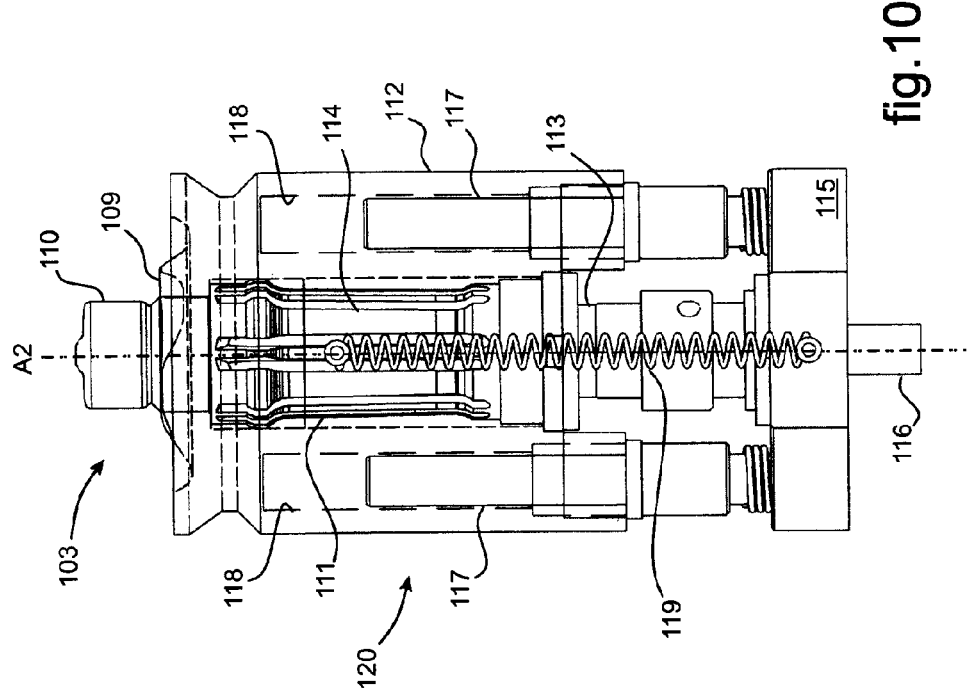
Figure 9:
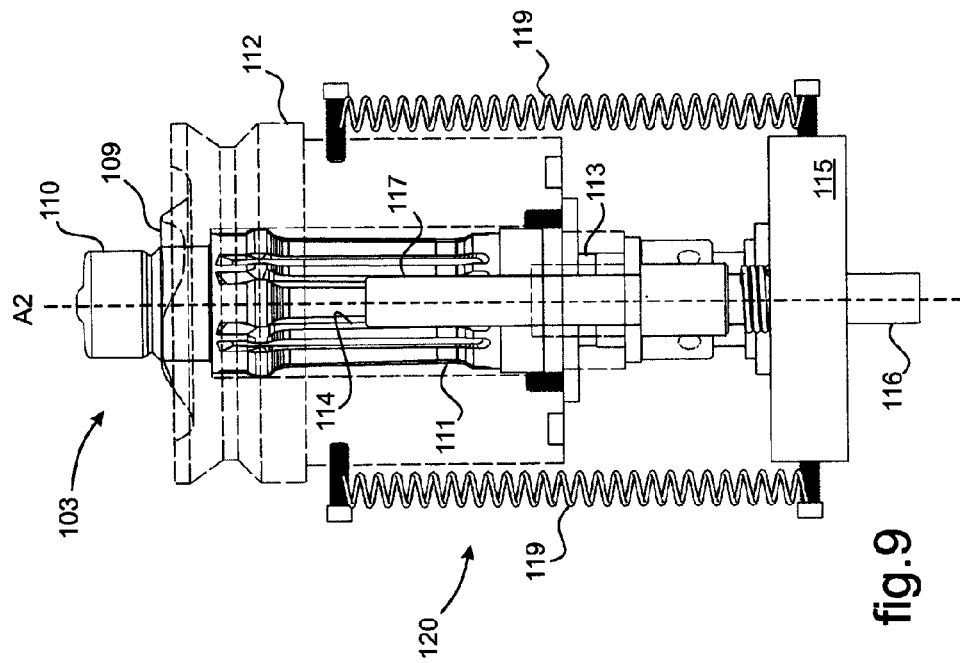

In FIG. 11 to FIG. 16, a method implements a device shown in FIG. 8 to FIG. 10 in order to mould the container 1 shown in FIG. 3 and FIG. 4 by blow-moulding a preform 107 installed inside the mould 101. In FIG. 11 and FIG. 16, the device is in idle position in an initial step of the method wherein the retractable member 111 is in deployed position using an expansion of the head 110 in moulding position. The retractable member 111 axially houses the piston 113, which extends inside the canal 114 intended for its circulation from the base 115 to the head 110 in order to induce its expansion. An operation of closing the mould 101 is controlled, in order to provoke a coming together of the shells 102 in relation to one another and a controlling of the implementing of motorised means of manoeuvring 116 that are provided on the base 115. The base 115 bearing the piston 113 and the frame 112 whereon are mounted the base 103 and the retractable member 111, is displaced in order to bring the wall for moulding 109 and the head 110 into moulding position towards the interior of the mould 101, such as shown in FIG. 12. The mould 101 being in closed position such as shown in FIG. 13, the blow-moulding of the preform 107 is carried out in order to mould the container 1 such as shown in FIG. 14. The demoulding of the container 1 is carried out in two steps. In a first step, the base 115 is displaced to the idle position by the motorised means of manoeuvring 116, such as shown in FIG. 15. The frame 112 is retained imprisoned between the shells 102 in order to maintain the base 103 and the retractable member 111 inside the mould 101. A relative displacement between the piston 113 and the retractable member 111 is induced, using a withdrawal of the piston 113 outside of the mould 101 and more specifically outside of the head 110, which radially retracts in demoulding position in order to authorise the withdrawal of the container 1 obtained. In a second step, a relative displacement between the retractable member 111 and the piston 113 is provoked during the operation of opening the mould 101 as shown in FIG. 16. An opening of the mould 101 releases the frame 112 from its engagement by the shells 102 which are manoeuvred as lateral separation from one another. The frame 112 being released from the engagement exerted by the shells 102, the latter is driven towards the base of the base 115 under the effect of the tension exerted by the means of recalling 119.

The preform 107 is a standard off-the-shelf preform commonly used in the field of blow-moulding, and is more preferably provided prior to its installation inside the mould with means of junction that are easily reversible 6 of the container 1 with the removable cap 7. According to an alternative for implementing the method, such means of junction 6 are able to be moulded on the neck 3 of the container 1, simultaneously to the forming of its wall via blow-moulding of the preform 107.

The method implemented authorises an easy adaptation of the mould 101 for the manufacture of containers 1 with specific capacities and/or exterior conformations. This adaptation consists only in changing the shells 102 and accessorily the wall for moulding 109 of the flared pocket 10, and where applicable in adjusting the position of emergence of the expandable head 110 outside of the wall for moulding 109 in order to adapt the axial extension H of the shoulder 12 according to the force of nesting which must be provided in order to assemble two containers 1.

The invention claimed is:

1. A modular receptacle comprising:
   a plurality of necked containers that are successively axially nestable with each other with placing in cooperation between their base and their neck extended by a flared section,
   the containers comprising members for axial nesting with a neighbouring container, of which at least one is arranged as a flange arranged around the neck of a container and of which at least one other is arranged as a recess for receiving the flange,
   said recess comprising a cavity open to the exterior which is arranged in the base of the containers and which comprises a blind tubular space for receiving a neck extended by a flared pocket for receiving the flared section extending from this neck, characterised in that
   wherein the recess is formed by the tubular space which is arranged as an undercut in the base of the container, said tubular space defining a chamber for receiving the flange with radial freedom and bearing axially in one direction against a shoulder formed in the base of the chamber opposite its blind surface.

2. The receptacle according to claim 1, wherein the flange is solid and is of a thickness that is significantly thicker than that of the wall of the container delimiting its interior volume.

3. The receptacle according to claim 2, wherein the flange is formed of a ring for receiving a preform from which is moulded the wall of the container by blow-moulding a thermoplastic material.

4. The receptacle as claimed in claim 1, wherein the shoulder is formed by the wall of the container using a plurality of successive inflections of this wall, which provide a bearing seat for the flange extended by a spacer of generally axial extension of separation between the seat and the flared pocket.

5. The receptacle as claimed in claim 1, wherein the containers incorporate means for relative immobilisation between two assembled containers, associating an antagonistic axial bearing engagement of the containers between the flange against the shoulder and the flared section against the flared pocket, and a radial bearing engagement between cooperating axially extended reliefs that respectively the flared section and the flared pocket comprise.

6. The receptacle as claimed in claim 1, wherein the flared section and the flared pocket comprise cooperating members for the radial stabilisation of the nesting between two containers, against a radial freedom of movement of the flange inside the chamber.

7. The receptacle as claimed in claim 1, wherein the flared section and the flared pocket comprise cooperating members for lateral bearing which generate an axial force between two assembled containers, under the effect of a relative rotating force carried out between the assembled containers.

8. The receptacle according to claim 5,
wherein the flared section and the flared pocket comprise cooperating members for the radial stabilisation of the nesting between two containers, against a radial freedom of movement of the flange inside the chamber,
wherein the flared section and the flared pocket comprise cooperating members for lateral bearing which generate an axial force between two assembled containers, under the effect of a relative rotating force carried out between the assembled containers, and
wherein the members for stabilising, the members for lateral bearing and the cooperating reliefs are confounded, by being formed respectively by at least one boss arranged on the flared section of a container which cooperates with a cavity arranged in the flared pocket of a neighbouring container.

9. The receptacle according to claim 8, wherein the contact surfaces between the boss and the cavity are transversally arched and arranged ramps of antagonistic lateral bearing which are axially extended by being inclined in relation to the axis of general extension of the containers.

10. The receptacle according to claim 8, wherein the ramps are inclined in relation to the axis of general extension of the containers by an angle between 30° and 75°.

11. The receptacle as claimed in claim 1, wherein the neck comprises at its free end means of junction that are easily reversible with a removable cap.

12. The receptacle according to claim 11, wherein the flange is formed by a ring arranged at a base of the cap.

* * * * *